(12) United States Patent
Sanchez et al.

(10) Patent No.: US 7,339,008 B2
(45) Date of Patent: Mar. 4, 2008

(54) MEMBRANES FOR SELECTIVE GAS SEPARATION

(75) Inventors: José-Grégorio Sanchez, Castries (FR); Philippe Gramain, Saint Gely du Fesc (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 11/475,205

(22) Filed: Jun. 27, 2006

(65) Prior Publication Data

US 2006/0236857 A1   Oct. 26, 2006

Related U.S. Application Data

(62) Division of application No. 10/363,775, filed on Mar. 27, 2003, now abandoned.

(51) Int. Cl.
*C08G 65/00* (2006.01)
*C08L 71/02* (2006.01)
*B01D 61/00* (2006.01)
*C08J 5/00* (2006.01)

(52) U.S. Cl. .................. 525/403; 210/654; 521/27

(58) Field of Classification Search ................ 525/403; 210/654; 521/27
See application file for complete search history.

(56) References Cited

U.S. PATENT DOCUMENTS

| 3,567,631 | A | * | 3/1971 | Lukach et al. ............... 210/654 |
| 5,670,051 | A | * | 9/1997 | Pinnau et al. ............... 210/651 |
| 5,851,267 | A | * | 12/1998 | Schwartz ....................... 96/7 |
| 5,936,004 | A | * | 8/1999 | Altmeier ..................... 521/32 |

FOREIGN PATENT DOCUMENTS

JP   57207504 A  * 12/1982

* cited by examiner

*Primary Examiner*—Randy Gulakowski
*Assistant Examiner*—A. Toscano
(74) *Attorney, Agent, or Firm*—Buchanan Ingersoll & Rooney PC

(57) ABSTRACT

The present invention relates to the use of a hydrophilic, biocompatible and biodegradable elastomer membrane or film for the selective separation of a gas mixture. Accordingly, processes for selective gas separation of a gas mixture are provided in which a gas mixture is contacted with such a membrane such that a selective portion of the gas mixture passes through the membrane.

11 Claims, No Drawings

MEMBRANES FOR SELECTIVE GAS SEPARATION

This application is a divisional application of U.S. patent application Ser. No. 10/363,775 filed Mar. 27, 2003, now abandoned the contents of which are incorporated by reference in their entirety.

BACKGROUND OF THE INVENTION

1. Field of the Invention

The present invention relates to the use of a hydrophilic, biocompatible and biodegradable elastomer membrane or film for the selective separation of a gas mixture.

2. Description of the Related Art

Gas separation using membranes composed of polymers is a process which is developing fast and it is used in numerous industrial fields.

Various processes for the separation and purification of gases and in particular hydrogen are employed in plants comprising very large membrane surface areas (Avrillon et al., "Les Techniques de Séparation de Gaz par Membranes" [Techniques for the Separation of Gases by Membranes], Revue de l'Institut Francais du Pétrole, 45, 4, July-August 1990).

In the field of the treatment of natural or synthetic gases, the separation and the purification of the components are essential in meeting the increasing requirements of users. Thus, crude natural gas and the derived components have to be freed, inter alia, from the carbon dioxide present by a "deacidification" operation. In this context, organic membrane processes have numerous advantages (low capital cost, low energy consumption), provided that the membranes have a high separating power and a high productive output.

The preparation of semipermeable organic membranes and their uses in gas separation were envisaged starting from polymers with highly varied structures. While the most widely studied polymers are glassy polymers, such as, for example, polyimides, polysulfones and polyphenylene oxides, elastomers, such as polysiloxanes, for example, are also of great interest. Glassy polymers generally have good selectivity but their permeability is often unsatisfactory, whereas elastomers have good permeability but are less selective (A. Stem, J. of Membr. Sci., 94, 1994; S. T. Hwang et al., Separation Science, 9(6), 1974). Generally, it has been found that there exists an inverse relationship between selectivity and permeability: the better the selectivity, the poorer the permeability.

In the field of the packaging of plants (fruit and vegetables) and in order to slow down internal ripening phenomena, it proved to be necessary to control the ambient humidity and the respiratory intensity of the packaged plant, resulting in absorption of oxygen and release of carbon dioxide. Thus, the reduction in the content of oxygen and/or the increase in the content of carbon dioxide in the atmosphere in which the plant is confined have the effect of slowing down its metabolism. However, very high concentrations of carbon dioxide and excessively low concentrations of oxygen can result in fermentation, which is capable of detrimentally affecting the appearance and the organoleptic properties of the plant. It is therefore necessary to adjust the permeability of the films according to the plants to be stored.

FR-2 776 534 (SEB) discloses membranes having good permeability and good selectivity with respect to carbon dioxide and their use in the storage of fruit and vegetables. These membranes comprise a support comprising a hydrophobic porous polymer coated with a layer of nonporous silicone reinforced by inorganic particles which are capable of regulating transfers of water vapor. The performance of these membranes in the application envisaged is, however, limited by the hydrophobic nature of the polymer used and by its low mechanical strength, which requires the use of a support.

U.S. Pat. No. 5,254,354 (Landec Corporation, Menlo Park, Calif.) discloses membranes with a permeability which varies radically and reversibly according to the temperature. These membranes are composed of polymers comprising crystallizable side chains and particularly small poly(ethylene oxide) chains.

U.S. Pat. No. 5,506,024 (Atochem, FR) discloses thermoplastic elastomer films based on polyetheresteramide with in particular poly(ethylene glycol) blocks. These films are very permeable to water vapor and to many gases.

SUMMARY OF THE INVENTION

The aim of the present invention is to provide membranes made of elastomer simultaneously exhibiting good permeability and good selectivity with respect to a given gaseous compound, sufficient mechanical strength to be able to be used in the form of very thin self-supported films, controlled hydrophilicity and good biodegradability, which are due to their chemical composition.

A subject-matter of the present invention is therefore a membrane for selective gas separation, a process for gas separation employing said membrane, and the application of the process to the separation and removal of carbon dioxide present in a gas mixture and to the storage of fresh fruit and vegetables.

The elastomer membrane according to the present invention is composed of an ethylene oxide copolymer (I) or of a polymer material obtained by crosslinking and/or by grafting such a copolymer (I), said copolymer (I) being characterized in that it is composed of:

at least 30% by number of —$CH_2CH_2O$— units derived from ethylene oxide (denoted hereinafter by "EO units"), and at least 2% by number of —CHR—$CH_2O$— units derived from an oxirane carrying a crosslinkable substituent R (denoted hereinafter by "REO units") and/or of —$CHR_1$—$CH_2O$— units derived from an oxirane carrying a noncrosslinkable substituent $R_1$ (denoted hereinafter by "R1EO units").

DETAILED DESCRIPTION OF THE PREFERRED EMBODIMENTS

In a specific embodiment of the invention, all the crosslinkable substituents R are identical and/or all the noncrosslinkable substituents $R_1$ are identical. In another embodiment, the copolymer carries different substituents R and/or different substituents $R_1$, which makes it possible to adjust certain properties of the membranes.

The respective proportions of the various EO, REO and R1EO units are chosen so that the polymer exhibits, optionally after crosslinking, a crystallinity which is sufficiently low not to harm the permeability of the membrane, a mechanical strength which is satisfactory for the membrane and a hydrophilic/hydrophobic nature suited to the use envisaged for the membrane, in particular for promoting the diffusion of water-soluble gases, such as $CO_2$, for example. Specific choices made in the abovementioned composition range make it possible to adjust the properties and the characteristics of the membrane to the treatment of a specific gas or gas mixture.

When the membranes are intended to be used at low temperatures, it is preferable to use a copolymer which is richer in -REO- units and/or in -R1EO- units. When the membranes are intended to be used at higher temperatures, of greater than approximately 60° C., the crystallinity of a poly(oxyethylene) tends to disappear and copolymers having a very high content of -EO- units can therefore be used. In this case, however, it may be useful to improve the mechanical strength of the membrane by crosslinking the copolymer to a greater or lesser extent according to the result desired.

The substituent $R_1$ is chosen from alkyl radicals having from 1 to 16 carbon atoms (more particularly alkyl radicals having from 1 to 8 carbon atoms), radicals comprising one or more thioether functional groups and/or one or more ether functional groups (for example, $-(CH_2)_n-O-((CH_2)_m-O)_p-R'$ radicals, R' being H, an alkyl or a phenyl, $0 \leq n \leq 4$, $1 \leq m \leq 4$ and $0 \leq p \leq 20$), or radicals comprising a carboxyl group or a hydroxyl group (for example, $-CH_2OH$ or $-(CH_2)_n-COOCH_3$). It is particularly advantageous to use, for the membrane of the invention, a copolymer comprising -R1EO- units in which $R_1$ is $CH_3$, said units being derived from propylene oxide.

R is a substituent which makes it possible to crosslink the copolymer (I). R can be a radical comprising a functional group which can be crosslinked by substitution, such as, for example, a haloalkyl radical, halomethyl or haloethyl radicals being particularly preferred, in particular the chloromethyl radical.

The substituent R can also be a radical comprising a functional group which can be crosslinked by addition, for example a double bond $-C=C-$ or a triple bond $-C\equiv C-$. Mention may in particular be made of the alkenyl radicals $CH_2=CH-(CH_2)_q-$ in which $1 \leq q \leq 6$ and the radicals $CH_3-(CH_2)_y-CH=CH-(CH_2)_x-$ in which $0 \leq x+y \leq 5$ and $0 \leq x$, in particular those which have from 3 to 10 carbon atoms, such as $-CH_2-CH=CH-CH_3$. Mention may also be made of the allyloxyalkylene radicals having from 4 to 8 carbon atoms, for example $-CH_2-O-CH_2-CH=CH_2$.

The substituent R can additionally be a radical which can be crosslinked by UV irradiation; mention may be made, among these radicals, of those which comprise a double bond $>C=C<$ or a triple bond $-C\equiv C-$. R can also comprise an activated double bond capable of crosslinking by cycloaddition; mention may be made, by way of example, of the cinnamate or chalcone groups. Such groups can in particular be incorporated in the copolymer by grafting onto the haloalkyl substituents.

A copolymer (I) can be crosslinked by irradiation with γ-radiation, with electrons or with other energetic particles. In this case, the presence of REO repeat units is not essential. The highly energetic radiation used can create, by tearing off atoms, highly reactive radicals which react with one another, the performance being improved by addition of proton-donating molecules, for example water. Depending on the composition of the copolymers and the nature of the repeat units constituting them, the membranes may exhibit a thermoplastic nature due to a residual crystallinity which [lacuna] be taken advantage of to facilitate the forming. Thus, an EO/EP copolymer of ethylene oxide and of epichlorohydrin in which the substituent R is a noncrosslinked chloroethyl radical and the EO/EP ratio by number is 90/10 has, at ambient temperature, a crystallinity which represents approximately 20% of that of a pure PEO.

A membrane according to the invention will preferably have a thickness of between 10 and 100 μm if it is intended to be used in the self-supported form. A very thin membrane, for example having a thickness of a few microns, is preferably deposited on a porous support.

Membranes comprising EO units and REO units and membranes comprising EO units, PO units (derived from propylene oxide) and REO units in which R is a haloalkyl are particularly useful as membranes in a process for the treatment of a gas mixture targeted at selectively separating carbon dioxide. Copolymers of ethylene oxide (EO) and of haloalkyl, in particular when the haloalkyl is an epihalohydrin (EH), can be used to prepare hydrophilic films which have a low glass transition temperature (between −60° C. and 40° C.) and which exhibit both high permeability and good selectivity for carbon dioxide. For the separation of the carbon dioxide present in a gas mixture, use is advantageously made of a membrane obtained from a copolymer of ethylene oxide (EO) and of epichlorohydrin (EP) in which the ratio by number of the two comonomers is preferably such that 50/50<EO/EP<98/2, more particularly 70/30<EO/EP<95/5. In these copolymers, a portion of the ethylene oxide units can advantageously be replaced by propylene oxide units.

The copolymers (I) can be obtained by processes of the prior art, such as by anionic or cationic copolymerization of ethylene oxide and of oxirane carrying a group R and/or of oxirane carrying a group $R_1$. The cationic polymerization employs in particular a catalyst of the Vandenberg type and generally involves a coordination mechanism. In addition, use may advantageously be made of copolymers sold in the noncrosslinked form. Mention may be made, as example of EO/EP copolymers, of the copolymers sold by Daiso under the name Epichlomer or by Zeon under the name Hydrin. These copolymers are composed of different substituted or unsubstituted oxirane units derived in particular from ethylene oxide, propylene oxide, epichlorohydrin and allyl glycidyl ether.

The membranes are prepared by forming a composition comprising the copolymer (I) and optionally an inorganic filler or an organic filler. The forming can be carried out, for example, by extrusion or by coating, which makes it possible to obtain crosslinked or noncrosslinked films with very low thicknesses, of the order of a few micrometers. The weight-average molecular masses of the copolymers used will be adjusted to the forming process chosen and to the targeted application. Thus, use will preferably be made of high weight-average molecular masses, typically obtained by cationic polymerization, to favor the mechanical strength of the films.

If a copolymer which has to be subjected to crosslinking is used for the preparation of a membrane according to the invention, the copolymer (I) composition additionally comprises appropriate reactants, for example a crosslinking agent, an acid scavenger (when the crosslinking reaction releases an acid compound) and optionally a crosslinking accelerator. The crosslinking can be carried out during or after the forming of the membranes. The degree of crosslinking of the copolymer used for the preparation of a membrane must be sufficient to ensure the mechanical strength and cohesion of the membrane. The crosslinking and in particular the amount of crosslinking agent are preferably adjusted so that 2 to 20% of the -REO- units participate in the crosslinking. When the comonomer is epichlorohydrin, the crosslinking agent, which is generally di- or trifunctional, is advantageously chosen from those which react with the chloromethyl radical to form HCl or a chloride salt. Mention may be made, by way of example, of trithiocyanuric acid or its salts, sold under the Zysnet® trade mark by Zeon, or 6-methylquinoxaline-2,3-dithiocarbonate, sold under the Daisonet trade mark by Daiso. Use may generally be made of di- or multifunctional compounds comprising reactive groups of the thiol type or their salts, alcohols, alkoxides or amines. Thus, for example, use will advantageously be made of 2,5-dimercapto-1,3,4-thiadiazole (Bismuthiol) or its salts, bis(aminopropyl) ether compounds, such as, for example, the products sold under the Jeffamine® trade mark by Huntsman, and cyclic amines, such as 1,4-diazabicyclo [2.2.2]octane, sold under the Dabco trade mark by Air Products and Chemicals. The degree of crosslinking is controlled by the amount of crosslinking agent, the temperature and the duration of the treatment.

Depending on the nature of the REO and R1EO units participating in the composition of the copolymer, the crosslinking reaction can be initiated by the thermal route, by the photochemical and radiative route or by microwaves. Thus, when the membrane is prepared by extrusion or coating, the crosslinking reaction can be carried out during or after the forming.

In a specific embodiment, a membrane formed from a crosslinked material carrying $R_1$ groups is prepared by partially crosslinking a copolymer of ethylene oxide and of an oxirane carrying crosslinkable haloalkyl groups R, preferably chloromethyl groups, and by reacting the partly crosslinked material obtained with an appropriate compound capable of reacting the haloalkyl groups, attaching $R_1$ groups. In this specific case, the $R_1$ groups are introduced into the membrane not during the preparation of the copolymer but during the preparation of the membrane from a copolymer. In this case, use is made, for the preparation of the membrane, of a composition comprising the copolymer of ethylene oxide and of an oxirane carrying crosslinkable groups R, a crosslinking agent (in an amount less than that which would be necessary to crosslink all the R groups) and a compound capable of reacting with the R groups which do not participate in the crosslinking. The reaction can be carried out during the extrusion at the same time as the crosslinking or else by a subsequent treatment. This specific embodiment is advantageous as it makes it possible to avoid the use of oxiranes carrying $R_1$ substituents, which it is often expensive or difficult, indeed even impossible, to produce.

The membranes of the invention are particularly effective for the selective separation of gas mixtures. The presence of the EO units confers on them a hydrophilic nature which can be adjusted by the presence of REO or R1EO units with hydrophobic natures. The EO/EP membranes in particular are highly effective for the selective separation of a hydrophilic gas present in the gas mixture, in particular carbon dioxide. This is why the membranes of the invention, in particular those which are prepared from copolymers of ethylene oxide and of epichlorohydrin, are of great interest in various industrial fields involving carbon dioxide. Mention will be made, for example, of the use for the separation and removal of the carbon dioxide present in natural or industrial gases (deacidification of gases) or for the storage of plants (fruit and vegetables).

The present invention is described in more detail with reference to the examples given below, to which, however, the invention is not limited.

EXAMPLE 1

Preparation of the Crosslinked Membranes from Copolymers of Ethylene Oxide (EO) and of Epichlorohydrin (EP)

The membranes 100, 200-1, 200-2, 300-1, 400-1, 400-2, 1200a, 1300a and 1100c were prepared according to the following procedure using copolymers with the compositions (in number of moles) shown in table I. The copolymer used for the membrane 300-1 is sold under the name Hydrin C2000 by Zeon.

10 g of copolymer are dissolved in 250 cm$^3$ of acetonitrile. For the copolymers rich in epichlorohydrin, a portion of the acetonitrile is replaced by dichloromethane. After complete dissolution, the solution is concentrated by evaporation under cold conditions in order to obtain approximately 60 ml of viscous solution. 0.5 g of K-Bismuththiol, dissolved beforehand in 5 cm$^3$ of acetonitrile, is added. The solution is subsequently cast on a flat antiadhesive support, dried at ambient temperature and then treated in an over at 150° C. for 10 minutes.

The crosslinking is monitored by measuring the degrees of swelling of the membranes in water and in dichloromethane.

EXAMPLE 2

Preparation of the Noncrosslinked Membranes

The membranes 500 and 600 were prepared from copolymers with the compositions (in number of moles) shown in table I, and the membrane 700 was prepared from an epichlorohydrin homopolymer, by way of comparison.

The procedure of example 1 was employed, the crosslinking agent being omitted.

EXAMPLE 3

Measurement of the the Permeability of the Membranes to Pure Gases

The measurements of permeability to pure gases were carried out by the "manometric" method based on the ASTM D 1434 standard (Standard test method for determining gas permeability characteristics of plastic film and sheeting, reapproved 1988). In addition, a controlled temperature chamber (±0.1° C.) and pressure sensors of very high accuracy (MKS Baratron 0-100 mbar) were used. Use of the data is based on solving the Fick's equations for gas diffusion in a dense film according to S. W. Rutherford and D. D. Do [Review of time lag permeation technique as a method for characterization of porous media and membranes, Adsorption, 3, (1997) 283-312].

The equipment is composed essentially of a membrane module suited to the flat geometry of the films, said module being connected upstream to a compartment which allows gas to be fed (up to 7 bar). A compartment forming a calibrated volume is found downstream. A vacuum system (low vacuum and ultrahigh vacuum, up to 10$^{-9}$ mbar) makes it possible to carry out exhaustive degassing of the membranes and of the two compartments (upstream and downstream compartments). After degassing, a constant pressure of 3 bar is introduced on the upstream side, while the increase in pressure in the calibrated volume downstream is recorded (through a data acquisition system coupled to a computer) as a function of the time. The curve obtained exhibits a transitory part (time lag) and a constant part, the permeability being deduced from the latter.

The permeability properties of the membranes prepared according to examples 1 and 2, measured in pure gases, are collated in table (I) below. The permeability is the Barrer permeability, expressed in $10^{-10}$ cm$^3$STP.cm.cm$^{-2}$s$^{-1}$.cmHg$^{-1}$. The selectivity is the ratio of the permeabilities.

The results confirm that the membranes obtained from a copolymer of ethylene oxide and of epichlorohydrin have an excellent performance in the separation of carbon dioxide present in a gas mixture, both in terms of permeability and of selectivity. The comparative example, produced from an epichlorohydrin homopolymer membrane, shows the very low permeability to $CO_2$ of this membrane.

TABLE (I)

| | Membrane references | | | | | | | | | | | |
|---|---|---|---|---|---|---|---|---|---|---|---|---|
| | 100 | 200-1 | 200-2 | 300-1 | 400-2 | 400-1 | 700 | 500 | 600 | 1200a | 1300a | 1100c |
| % EO/EP/PO | 93/7/0 | 83/17/0 | 83/17/0 | 50/50/0 | 96/4/0 | 96/4/0 | 0/100/0 | 85/2/13 | 50/0/50 | 55.9/44.1 | 61/39 | 87/13 |
| Thickness in microns | 429 | 522 | 200 | 590 | 250 | 486 | 850 | 212 | 550 | 100 | 110 | 330 |
| Permeability | | | | | | | | | | | | |
| $CH_4$ | 6.2 | 4.5 | 4.6 | 3.3 | 3.9 | 3.3 | | 4.9 | 10.0 | 0.35 | | |
| $CO_2$ | 104 | 75.0 | 84.8 | 17.6 | 66.5 | 58.7 | 0.33 | 180 | 97.8 | 15.1 | 21.8 | 69.4 |
| $H_2$ | 9.5 | 8.5 | 7.5 | 5.2 | 8.0 | 5.5 | | 12.4 | | 2.95 | 4.5 | 7.7 |
| He | 7.5 | 5.0 | 2.7 | 3.9 | 4.3 | 3.3 | | 8.2 | | 2.5 | 2.7 | 4.3 |
| $N_2$ | 1.7 | 2.0 | 1.5 | 0.55 | 4.1 | 0.95 | 0.25 | 3.6 | 5.8 | 1.4 | 3.6 | 1.4 |
| $O_2$ | 4.6 | 4.0 | 5.7 | 1.1 | 3.1 | 2.8 | | 8.5 | 9.5 | 1 | 1.3 | 7.2 |
| $C_2H_6$ | 15.2 | — | 11.5 | 3.0 | 8.15 | — | | 42.4 | | | | |
| $C_3H_8$ | 39.8 | — | — | 23.0 | 10.8 | — | | 13.4 | | | | |
| $C_4H_{10}$ | 59.7 | — | 82.5 | 89.0 | 46.7 | — | | 101.0 | | | | |
| Selectivity | | | | | | | | | | | | |
| $CO_2/N_2$ | 61 | 37.5 | 56.5 | 32 | 16.2 | 18 | 1.3 | 50 | 16.9 | 10.8 | 6.1 | 49.6 |
| $CO_2/He$ | 14 | 15 | 31.4 | 4.5 | 15.5 | 18 | | 22 | | 6.0 | 8.1 | 16.1 |
| $CO_2/H_2$ | 11 | 8.8 | 11.3 | 3.5 | 8.3 | 10.4 | | 14.5 | | 5.1 | 4.8 | 9.0 |
| $CO_2/O_2$ | 23 | 18.8 | 14.9 | 16 | 21.5 | 21 | | 21.2 | 10.3 | 15.1 | 16.8 | 9.6 |
| $CO_2/CH_4$ | 17 | 16.7 | 18.4 | 16 | 17.1 | 18 | | 36.7 | 9.8 | 43.1 | — | |
| $O_2/N_2$ | 2.7 | 2.0 | 3.8 | 2.0 | 0.8 | 3.0 | | 2.4 | 1.6 | 0.7 | 0.4 | 5.1 |

What is claimed is:

1. A process for selective gas separation of a gas mixture comprising:
   (A) contacting a composition consisting essentially of said gas mixture, wherein said gas mixture comprises carbon dioxide, with a membrane to provide a carbon dioxide enriched permeate and a carbon dioxide depleted retentate,
   wherein the membrane comprises (i) an ethylene oxide copolymer (I), or (ii) a polymer material obtained by crosslinking copolymer (I),
   wherein the copolymer (I) comprises (a) at least 30% by number of —$CH_2CH_2O$— units derived from ethylene oxide, and (b) at least 2% by number of —CHR—$CH_2O$— units derived from an oxirane carrying a crosslinkable substituent R and/or of —CHR$_1$—$CH_2O$— units derived from an oxirane carrying a noncrosslinkable substituent R$_1$,
   (B) applying a pressure on the upstream side of said membrane, such that a selective portion of the gas mixture passes through the membrane, and
   (C) collecting the carbon dioxide enriched permeate and a carbon dioxide depleted retentate.

2. The process of claim 1, wherein all the crosslinkable substituents R are identical and/or all the noncrosslinkable substituents R$_1$ are identical.

3. The process of claim 1, wherein the copolymer (I) comprises different substituents R and/or different substituents R$_1$.

4. The process of claim 1, wherein the substituent R$_1$ is selected from the group consisting of alkyl radicals having from 1 to 16 carbon atoms; radicals comprising one or more ether or thioether functional groups; and radicals comprising a carboxyl group or a hydroxyl group.

5. The process of claim 1, wherein the substituent R is a substituent which makes it possible to crosslink the copolymer (I).

6. The process of claim 5, wherein the substituent R is a radical comprising a functional group which can be crosslinked by substitution or by addition.

7. The process of claim 6, wherein the substituent R is a haloalkyl radical or a radical comprising a double bond —C=C— or a triple bond —C≡C—.

8. The process of claim 1, wherein the substituent R is a radical which can be crosslinked by UV irradiation.

9. The process of claim 1, wherein the membrane is obtained by crosslinking the copolymer (I) by irradiation with γ-radiation or with electrons.

10. The process of claim 1, wherein the copolymer (I) is a copolymer of ethylene oxide and epichlorohydrin and the ratio by number of ethylene oxide/epichlorohydrin units is between 50/50 and 98/2.

11. The process of claim 1, wherein the gas mixture comprises hydrophilic components and the membrane separates the hydrophilic components from the gas mixture by selectively passing the hydrophilic components through the membrane.

* * * * *

UNITED STATES PATENT AND TRADEMARK OFFICE
CERTIFICATE OF CORRECTION

PATENT NO. : 7,339,008 B2  Page 1 of 1
APPLICATION NO. : 11/475205
DATED : March 4, 2008
INVENTOR(S) : Jose-Gregorio Sanchez et al.

It is certified that error appears in the above-identified patent and that said Letters Patent is hereby corrected as shown below:

On the Title Page item: (22) PCT Filed: please insert --September 12, 2001--;

On the Title Page item: (86) PCT No.: please insert --PCT/FR01/02833--;

§371 (c)(1),
(2), (4) Date: please insert --June 27, 2006--;

On the Title Page item: (87) PCT Pub No.: please insert --WO2002/022245--;

PCT Pub Date: please insert --March 21, 2002--

On the Title Page item: (62) Related U.S. Application Data: please change "Division of application No. 10/363,775, filed on Mar. 27, 2003, now abandoned."

to

--Division of application No. 10/363,775, filed on Mar. 27, 2003, now abandoned, which is a 371 application of PCT/FR01/02833, filed September 12, 2001.--

Signed and Sealed this

Nineteenth Day of October, 2010

David J. Kappos
*Director of the United States Patent and Trademark Office*